United States Patent [19]

Porter

[11] Patent Number: 4,640,864
[45] Date of Patent: Feb. 3, 1987

[54] FACING FOR PLASTIC FOAMED CONSTRUCTION INSULATION BOARD

[75] Inventor: John F. Porter, St. Catharines, Canada

[73] Assignee: Bay Mills Limited, St. Catharines, Canada

[21] Appl. No.: 607,287

[22] Filed: May 4, 1984

[51] Int. Cl.⁴ .................. B32B 23/04; B32B 17/10
[52] U.S. Cl. ........................... 428/334; 428/309.9; 428/318.4; 428/486; 428/514; 428/921; 428/286; 428/438; 156/182; 156/79
[58] Field of Search ............... 428/486, 438, 514, 334, 428/921, 309.9, 318.4

[56] References Cited

U.S. PATENT DOCUMENTS 3,992,842 11/1976 Haage et al. ..................... 428/443
4,169,082 9/1979 Kusterer, Jr. ..................... 428/514
4,347,281 8/1982 Futcher et al. .................. 428/318.4
4,377,649 3/1983 Sweeney et al. .................. 428/486
4,414,265 11/1983 Rosato ............................ 428/285

Primary Examiner—P. C. Ives
Attorney, Agent, or Firm—Fitzpatrick, Cella, Harper & Scinto

[57] ABSTRACT

Facings for plastic foamed construction insulation board are made from paper treated with a treatment comprising about 10% to 100% of the weight of the paper including polymer, water repellant, and fire retardant. A reinforcing scrim may be combined with the paper. The treatment is applied to paper, the scrim is combined with the paper, and foam-forming liquids are applied to the paper to form a facing for a plastic foamed construction insulation board.

13 Claims, No Drawings

FACING FOR PLASTIC FOAMED CONSTRUCTION INSULATION BOARD

BACKGROUND OF THE INVENTION

1. Field of the Invention

This invention relates to facings for use with plastic foamed construction insulation boards. These boards are used primarily in roofs and walls, and they serve to insulate the interior of buildings from heat and cold.

2. Description of the Prior Art

Facings for plastic foamed construction insulation board are located on one or both sides of a central plastic foamed core and during manufacture of the boards support liquids which are used to create the plastic foam. In order to provide a good bond between the facing and the board, it is desirable that the liquid flow partially into the facing, but it is also important that no foam-forming liquid flow through or "bleed" through the facing during manufacturing, inasmuch as that tends to contaminate the manufacturing machinery with plastic.

Between manufacture and installation, and after installation, facings provide strength and durability to resist moisture and other damage, which can result in loss of insulating properties. In many uses these boards must resist substantial stresses such as may result from the lifting effect of wind when the boards are installed on roofing. The facing material should provide strength to the boards to resist such forces.

Facings used with insulation boards of the plastic foamed type have included metal foils sometimes reinforced with scrim, as shown in U.S. Pat. No. 4,073,998 issued to P.M. O'Connor, and mats of glass fibers as exemplified by U.S. Pat. Nos. 4,388,366 and 4,414,265, issued to D.W. Rosato. Facing materials may also include expanded pearlite boards, metal foils, organic felt, heavy papers saturated with 100% or more of their weight in asphalt, plywood, hard board, cement-asbestos board, reinforced plastic, tempered glass and glass fiber board. Paper alone has not been used for this purpose probably because one would expect (i) foam-forming liquids to bleed through paper during manufacture of the board, (ii) moisture to seep through the paper after manufacture, which could cause delamination, (iii) paper to be dangerously flammable, and (iv) paper's lack of dimensional stability to cause warped boards.

SUMMARY OF THE PRESENT INVENTION

This invention comprises processes for making a facing which is thin, light weight, and flexible for use in plastic foamed construction insulation boards. It also comprises a facing which includes (a) paper which has been treated with a treatment comprising materials, such as a polymer, a water repellant, and a flame retardant, whose combined dry weight is about 10% to 100% of the weight of the paper and (b) a reinforcing scrim combined with the paper. The materials in the treatment of this invention. coat fibers in the paper, fill or reduce the size of interstices in the paper, and impart to the paper fire retardancy, water repellency, reduced porosity and reduced ability to transmit liquids through the fibers of the paper, such that foam-forming liquids used in manufacturing the plastic foamed construction insulation board do not bleed through the facing during manufacture. The paper is provided with sufficient strength and durability to be useful for plastic foamed construction insulation board, while using lower weight and less expensive components than the prior art.

DETAILED DESCRIPTION OF THE PREFERRED EMBODIMENT

The facings of this invention may be used with plastic foams of various kinds, including urethane, isocyanurate, polystyrene, pheonolic, urethane-modified isocyanurate, phenol formaldehyde, urea formaldehyde, and melamine formaldehyde foams.

Papers of various weights and composition may be used in the invention. A bleached semi-crepe tissue paper of 20 lbs. (9 kg.) basis weight is preferred, and the weight of paper may vary from 10 to 40 lbs. (5 to 18 kgs.) paper. "Pounds" or "lbs." refer to the number of pounds in 3,000 sq. ft. (279 sq. meters) of paper. Preferred papers are less than 5 mils.(thousandths of an inch) (0.127 mm.) in thickness, and the most preferred paper has a thickness of about 3 mils (0.0762 mm.). Such papers are significantly less expensive and lighter in weight than materials used by the prior art as facings for plastic foamed construction insulation board; the treatment as set forth below makes such papers sufficiently strong, bleed-through resistant, and durable to be useful as facings for such boards while retaining the cost advantages and light weight of thin paper. Paper which is made 100% from cellulose material is preferred, but non-woven glass continuous filaments or glass staple, or other material such as polyester or other synthetic fibers, may also be incorporated into the paper, preferably not to exceed 50% by weight of the paper.

The scrim used in our invention may be made of fiberglass, polyester or other equivalent materials. It is preferred to use a non-woven scrim of fiberglass coated with polyvinyl alcohol, but other materials may be applied to the scrim. The term "scrim" is used to mean an open mesh or net fabric of criss-crossed yarns or threads which is woven or non-woven.

In the most preferred method the paper is bonded to the scrim while the polyvinyl alcohol on the scrim is wet, or if the polyvinyl on the scrim has previously dried, the scrim is wetted to make the polyvinyl alcohol sticky. A preferred polyvinyl alcohol is Dupont's Elvanol dissolved in water. Also preferred are scrims coated with other thermosetting resins or with thermoplastic resins, such as polyvinyl chloride resins.

In the bonding process, the scrim and the paper are brought together and passed over steam cans. The pressure from tension is sufficient to bond the scrim to the paper. It is preferred to bind the scrim to the paper first and treat the composite paper and scrim while bonded together. The scrim may also be incorporated directly into the paper during paper manufacture or placed between two layers of paper.

The preferred scrim is a continuous multi-filament fiberglass and may have a yarn number from 150 to 18 1/0 and may range between 33 and 264 tex. We prefer to use ECG 37 1/0, in which 37 indicates a yield of 3,700 yards of yarn per one pound. Nylon or polyester, which provides toughness and elongation in the facing, may be used. The strength of the preferred scrim is 30 to 40 lbs. per inch (5 to 7 kgs per cm.) of width and scrims with strengths ranging from 5 to 90 lbs. per inch (1 to 16 kgs per cm.) of width may be used. The preferred openings between yarns in the scrim range from one-tenth to about one inch (0.25 to 2.5 cm.) between yarns and larger so long as sufficient strength for wind resistance or other purposes is provided. It is preferred to place the scrim material adjacent to the insulation foam during the manufacture of the insulation board.

Boards having facings of our invention have been subjected to wind uplift tests, which are tests used to determine whether a roofing material will withstand the force of wind when installed, and the facing of this invention has proven sufficiently strong to meet industry standards for such strength.

In the processes of preparing the facing of our invention, paper, whether bonded to the scrim previously or not, is treated with a treatment to be described below. Preferably the treatment is in liquid form and the paper is led through the treatment where it picks up the materials to be added to the paper. Thereafter, the paper may be squeezed and dried. Various methods of applying the treatment may be used, including dip-coaters, doctor blade devices, and the like.

The preferred method of treating the paper with materials of the treatment is to have the lower portion of one roller partially submerged in a trough of the treatment material and the paper and scrim composite run against the upper portion of the same roller so that an amount of the treatment material is transferred to the scrim and paper composite. A second roller above the first roller controls the movement of the paper and scrim composite and the uniformity of the amount of material on the paper/scrim composite. Thereafter the composite is led in a preferred method to steam cans to expedite drying. It is preferred to pass the paper over steam cans at 300° F. (150 ° C.) which drives the water off and additionally may cause some flow of the treatment material as in the case of polyvinyl chloride. It is believed that such flow tends to further fill interstices and reduce porosity in the paper and it may tend also to coat further and more uniformly fibers within the paper with the treatment materials. It is preferred to use in such additional heat treatment a polyvinyl chloride resin which tends to form a film at temperatures between about 180° F. and 230° F. (80° C. to 110° C.).

The treatment applied to the paper or the paper/scrim combination is preferably a mixture or solution comprising a polymer, a fire-retardant, and a water-repellant. The polymer and other treatment materials may also be added in the form of a dispersion or an emulsion and typically include small particles of treatment materials. Since the liquid permeability of polyvinyl chloride is less than the liquid permeability of paper fibers, the treating of paper fibers with such polymer dispersion reduces the liquid permeability of the paper overall, thereby reducing transmission of liquids through the paper and bleed-through. In addition, polyvinyl chloride or other treatment materials tend to block or reduce the number or size of pores in the paper, thus reducing the porosity of the paper and also reducing the amount of bleed through. Polyvinyl chloride materials we most prefer have a glass transition temperature of about 62° C. Also preferred are polyvinyl chloride materials with a glass transition temperature of 30° C. to 75° C., and such materials with glass transition temperature ranging from about 0° to about 75° C. may be used.

Fire retardants may be halogenated paraffin retardants or halogenated phosphorous complexes or other such materials, including bromated phosphorous complexes, and antimony with a halogenated organic compound. Ammonium phosphate, colloidal antimony, borax and and other similar materials may also be used.

Water repellants may preferably be dispersion of paraffin or other high molecular weight waxes. A combination of a paraffin dispersion plus a quaternized ammonium salt, for example, or emulsions of polyethylene, which are essentially high molecular weight paraffins, and other water repellants may be used. Water repellancy and fire retardancy may be imparted by a single compound or composition which possesses both properties, or by a properly selected polymer.

One advantage of the treatment of the present invention is that the degree of porosity may be controlled. Certain amounts of porosity are often desirable in the final product in order that (a) vapors may pass through the facing, and (b) the foam-forming liquids may flow partially into the facing and provide a good bond. However, it is always important that the facing be sufficiently low in porosity that low viscosity liquid plastic foam-forming materials used in making plastic foamed construction insulation board do not bleed through the facing during manufacture. Using an air permeability measurement, we determined the porosity of papers utilized in the present invention both before treatment and after treatment and found that for a 12-lb. paper, the porosity, as measured in terms of air permeability, before treatment is 100 cu. ft. per minute per sq. ft. of air passing through the paper at one-half inch of water pressure ("c.f./m./sq. ft.")(31 cubic meters per minute per square meter). After treatment, the same paper has an air permeability of 40 c.f./m./sq. ft. which will make a satisfactory but not superior product. In the case of untreated 20 lb. paper, the air permeability was measured at 12 c.f./m./sq. ft. and after treatment was reduced to 7 c.f./m./sq. ft. We note in this connection that glass mat of the prior art when treated with non-wicking agents may have an air permeability of 650 c.f./m./sq. ft.

Not only does the treatment of the present invention reduce the porosity of the paper, but in preferred embodiments it improves the physical properties, including the strength and toughness of the paper. For example, untreated 20 pound paper had a tensile strength of 6.7 pounds per inch of width (1.2 kg./cm) and a stretch or elongation of 3.0%. A sample of the same paper treated in accordance at this invention had a strength of 8.3 pounds per inch of width (1.48 kg/cm.) with an elongation of 4.2%. Such increases in strength and elongation increase the toughness of the paper and provide a facing which is more durable than untreated paper with respect to certain stresses, such as holes caused by fingers which can be created inadvertantly in shipping or installation.

The treatment provided by the present invention is to be distinguished from mere painting of surfaces which produces a sealed surface and gives the foamed plastic no fibers to impregnate partially and bind to solidly. The treatment of the present invention is also to be distinguished further from the application solely of non-wicking agents such as fluorocarbon non-wicking agents, which are applied in substantially smaller weight amounts providing essentially only a monomolecular coating, and which because of their low surface-free energy create surfaces which make virtually all liquids bead-up and roll off, including low viscosity, foam forming liqnds used in making plastic foam. Such liquids typically contain surfactants to make them wet even water-repellant surfaces. Non-wicking agents provide substantially less wetable surfaces than are created by the water repellants of the present invention. As the term "water repellant" is used herein, it does not include "non-wicking" agents.

The mechanism by which the present invention reduces bleed through is believed to lie mainly in two factors, both of which are related to the physical blocking of liquid passage through the paper, not to he repellancy of liquids by means of non-wicking agents. First, the treatment of the present invention reduces the porosity of the paper by blocking some or all of the pores. Second, in the present invention the treatment may also coat the fibers of the paper and because the treatment has less permeability to liquids than the paper fibers, the flow of liquids through the fibers of the paper is reduced. The materials of the present invention should also be distinguished from asphalt impregnated heavy papers in which the asphalt material saturates and totally fills the paper and is believed to increase the weight of the composite by more than 100% of the weight of the paper.

The dry weight of the materials in the treatment of this invention may range between 10% to 100% of the weight of the paper or preferably may range between 10% and 40%. The optimal treatment weight as a percent of paper weight is 20% to 35%.

Set forth below are specific examples of the invention in which the dry weight of the components of the treatment are set forth as numerical ratios. These components are combined with sufficient water to make a suitable solution or dispersion. The water is removed in later processing, leaving behind the dry components of the treatment.

EXAMPLE 1

Treatment Materials:

|  | Dry Weight | Wet Weight |
|---|---|---|
| Poly(vinyl chloride) (GEON 351, a product of B.F. Goodrich) | 100 | 178.6 |
| Fire retardants (FYARESTOR 330, a bromated phosphorous complex, Pearsall Chemicals, a division of Witco Chemical) | 40 | 120.0 |
| (FYARESTOR 100E, a halogenated paraffin, Pearsall Chemicals) | 10 | 10.0 |
| (HFR 201, a colloaidal antimony pentoxide, Harshaw Chemical) [or a comparable Nyacol product may be used] | 12.5 | 25.00 |
| Water repellants (AEROTEX 96 a blend of a parafin and a quaternary ammonium salt, American Cynamid) | 10 | 40.0 |
| (Accelerator UTX for AEROTEX 96) | 1.5 | 6.0 |
| (FC-824, a flurochemical designed to impart alcohol and water repallancy, 3 M Co.) | 1.5 | 3.75 |
| Water | — | 300.00 |
|  | 170.5 | 683.35 |

A twenty-pound tissue paper with adhesively bonded scrim was treated with this treatment and dried. The weight gain was about 26% of the weight of the paper.

EXAMPLE 2

Treatment Materials:

|  | Dry Weight | Wet Weight |
|---|---|---|
| Poly(vinyl chloride) (GEON 351) | 100 | 178.6 |
| Fire retardants (FYARESTOR 330) | 50 | 150.0 |
| (HFR 201) | 20 | 40.0 |
| Water repellants (AEROTEX 96) | 10 | 40.0 |
| (Accelerator UTX) | 1.5 | 6.0 |
| (FC-824) | 1.5 | 3.75 |
| Water | — | 300.00 |
|  | 183 | 718.35 |

A twenty-pound tissue paper with adhesively bonded scrim was treated with this treatment and dried. The weight gain was about 25% of the weight of the paper.

EXAMPLE 3

A 20 pound bleached tissue paper was treated with an aqueous blend of the following:

| Component | Dry Weight |
|---|---|
| Poly(vinyl chloride) Latex | 100 |
| Colloidal Antimony Pentoxide | 20 |
| Brominated Phosphorous complex | 50 |
| Reactive water repellant | 10 |
| Catalyst for water repellant | 2 |

After drying, the resulting weight gain was in the 20–35% weight range.

EXAMPLE 4

The treated tissue in Example 3 was combined with a glass scrim having two glass yarns per inch in both directions, each yarn having a breaking strength of about 16 pounds.

EXAMPLE 5

The treated tissue in Example 3 may be combined with a polyester scrim having 2 yarns per inch in both directions, each yarn having a breaking strength of about 15 pounds.

EXAMPLE 6

The tissue in Examples 3 or 4 may be treated with additional amounts of the latex component and the water repellant and catalyst may be eliminated.

EXAMPLE 7

A tissue similar to that in Example 3 or 4 may be made except that 35% of the weight of the fibers in the paper may be glass.

EXAMPLE 8

A urethane or isocyanurate foam board may be made faced on one or both sides with facings of the above examples.

EXAMPLE 9

The treated tissue in Example 3 may be subsequently rendered less porous by application of heat and pressure, e.g., by passing it through hot squeeze rolls.

The invention claimed is:

1. A plastic foamed construction insulation board facing that is flexible, thin, and light weight and capable of use in manufacturing such board in which the plastic foam is formed on the facing during manufacture of the board consisting essentially of,
  (a) paper, said paper having a basis weight of from about 10 pounds to about 20 pounds and having been treated with a treatment comprising materials whose dry weight is about 10% to 100% of the weight of the paper and which treatment coats fibers in said paper with a composition which provides means for reducing the liquid permeability of fibers of said paper, filling interstices in said paper, and imparting to the paper fire retardancy, water repellancy, reduced porosity, and reduced ability to transmit liquids through said paper,
  (b) and a reinforcing scrim adhesively bonded to said paper.

2. A plastic foamed construction insulation board facing that is flexible, thin, and light weight and capable of use in manufacturing such board consisting essentially of,
  (a) paper, said paper having a basis weight of from about 10 pounds to about 20 pounds and having been treated with a treatment which comprises a polymer which provides means for reducing liquid permeability of the paper, the dry weight of such treatment being about 10% to 100% of the weight of the paper, and
  (b) a reinforcing scrim adhesively bonded to said paper,
such that liquids used in preparing a plastic foamed insulation construction board do not bleed through said paper.

3. A plastic foamed construction insulation board facing that is flexible, thin, and light weight and capable of use in manufacturing such board consisting essentially of, paper, said paper having a basis weight of from about 10 pounds to about 20 pounds and having been treated with a treatment which comprises a polymer, a fire retardant and a water repellant, the dry weight of which treatment is about 10% to 100% of the weight of the paper and which treatment coats fibers in said paper with a composition which provides means for imparting to said paper reduced porosity, reduced ability to transmit liquids through said paper, fire retardancy, and water repellancy.

4. The facing of claim 2 in which the polymer is thermoplastic.

5. The facing of claim 4 in which the thermoplastic has a glass transition temperature between 0° and 75° C.

6. The facing of claim 2 in which the paper thickness is less than about 5 mils.

7. The facing of claim 3 in which the paper is less than about 5 mils thick and the dry weight of the treatment is about 20 to 35%.

8. The facing of claim 2 in which the facing has an air permeability of less than 40 c.f./m./sq.ft.

9. The facing of claim 2 in which the scrim comprises fiberglass and polyvinyl alcohol.

10. The facing of claim 2 in which the scrim is composed primarily of polyester.

11. The facing of claim 3 in which the paper includes up to about 50% of glass or polyester materials.

12. The facing of claim 1 in which the treatment comprises (i) a water repellant which includes a dispersion of a high molecular weight wax, (ii) a fire retardant which includes a halogenated fire retardant or a halogenated phosphorous complex, and (iii) a polyvinyl chloride polymer; and the dry weight is about 20 to 35%.

13. The facing of claim 2 in which the paper is a tissue paper.

* * * * *